United States Patent
Schultz

(10) Patent No.: US 11,993,199 B2
(45) Date of Patent: May 28, 2024

(54) WIRELESS TRANSMITTING STRAP TENSION MONITORING DEVICE

(71) Applicant: John Andrew Schultz, Troy, MI (US)

(72) Inventor: John Andrew Schultz, Troy, MI (US)

( * ) Notice: Subject to any disclaimer, the term of this patent is extended or adjusted under 35 U.S.C. 154(b) by 197 days.

(21) Appl. No.: 17/323,272

(22) Filed: May 18, 2021

(65) Prior Publication Data

US 2022/0371506 A1   Nov. 24, 2022

(51) Int. Cl.
| | |
|---|---|
| *B60P 7/06* | (2006.01) |
| *B60P 7/08* | (2006.01) |
| *G01L 5/10* | (2020.01) |
| *G01L 5/102* | (2020.01) |
| *G01L 5/107* | (2020.01) |
| *H04M 1/72415* | (2021.01) |

(52) U.S. Cl.
CPC .............. *B60P 7/0861* (2013.01); *G01L 5/10* (2013.01); *G01L 5/107* (2013.01); *H04M 1/72415* (2021.01)

(58) Field of Classification Search
CPC ........ B60P 7/0861; G01L 5/102; G01L 5/107; B60R 22/48; B60R 2022/4841
See application file for complete search history.

(56) References Cited

U.S. PATENT DOCUMENTS

| | | | |
|---|---|---|---|
| 6,205,868 B1* | 3/2001 | Miller ................... | G01D 5/147 324/207.2 |
| 6,796,192 B2* | 9/2004 | Sullivan ................. | B60R 22/48 73/862.391 |
| 2011/0006899 A1* | 1/2011 | Eide ....................... | B60P 7/0861 340/568.1 |
| 2013/0162420 A1* | 6/2013 | Stoddard ............... | B60P 7/0861 340/425.5 |
| 2017/0129383 A1* | 5/2017 | Bika ....................... | G01L 5/047 |
| 2019/0001863 A1* | 1/2019 | Taylor .................... | H04W 4/70 |
| 2022/0111784 A1* | 4/2022 | Myers .................... | G07C 3/02 |
| 2022/0146341 A1* | 5/2022 | Wenzel .................. | G01L 1/2206 |
| 2022/0242302 A1* | 8/2022 | Goetz .................... | B60P 7/0869 |

FOREIGN PATENT DOCUMENTS

WO    WO-2020001704 A1 *  1/2020 ........... B60P 7/0861

* cited by examiner

*Primary Examiner* — Daniel J Colilla

(57) ABSTRACT

A tension monitoring device that attaches or clamps onto to a tensioned cargo load securing strap and wirelessly communicates the tension level to the driver via a remote device, such as a mobile smartphone. One or more devices may be installed on a vehicle or trailer to be simultaneously monitoring the tension conditions during transit. The tension signal from the device is received and processed by the mobile smartphone application to display the real-time tension relative to unsafe levels and transmit alerts to the driver when an unsafe or undesired condition occurs. The tension monitoring device includes an electromechanical sensor and microprocessor, powered by a battery, and packaged inside two hinged weatherproof housings for the ability to clamp onto a tensioned cargo strap.

8 Claims, 6 Drawing Sheets

WIRELESS TRANSMITTING STRAP TENSION MONITORING DEVICE

BACKGROUND OF THE INVENTION

The present disclosure relates to a device which monitors the tension in a strap or cable that secures cargo to vehicles such as, but not limited to, trailers, trucks, aircrafts, watercrafts, and other type of cargo transporting vehicles. More specifically, the device monitors and wirelessly communicates the real-time strap tension level to the driver through a remote device, such as a mobile smartphone application or other monitoring displays.

On road accidents caused by improperly secured or shifting heavy cargo loads are dangerous, costly, and commonplace. Cargo is often secured by a pre-set tensioned cargo strap attached to an open flatbed trailer prior to embarking on a trip to transport the cargo. Said cargo is then subjected to vehicle driving forces, such as road bumps, wind, turning, accelerating, and stopping, which cause the cargo to shift on the trailer and, therefore, alter the pre-set tension on the strap. This change in tension can become a danger to nearby motorists if the tension is loosened to the point where cargo can fall off the trailer, onto the roadway, and cause an accident. The result of this type of roadway accident ranges from costly physical property damage to death of motorists.

Moreover, a driver transporting cargo is not aware of or currently able to monitor changes to the tension of the strap without stopping the vehicle in route to physically inspect the strap tension. Not only is this visual roadside inspection unreliable, intermittent, and inefficient but it also subjects the driver to other roadside dangers such as passing traffic and inclement weather. Most drivers that are transporting cargo are doing so commercially and will lose productivity from said physical inspections or damaged cargo that falls off the trailer.

The device in this invention uses electromechanical technology to measure and monitor the tension of the strap in real-time and wirelessly communicate the tension level to the driver through a mobile smartphone application. This allows the driver to monitor the tension of the cargo straps more effectively and efficiently as compared to the conventional method of intermittently stopping to physically inspect strap tension. The device in this invention not only improves roadway safety to the driver and nearby motorists, but also improves the productivity of the driver by eliminating time wasted from a roadside physical inspection and mitigating the risk of cargo damage from falling off the trailer. The device will continuously monitor the tension of the cargo strap for the driver and alert the driver through a smartphone notification when the tension changes to an unsafe condition. This allows the driver to remain fully focused on transporting the cargo more safely and efficiently.

BRIEF SUMMARY OF THE INVENTION

One or more aspects of the exemplary embodiments below solve the problems and disadvantages described in the background section above.

In general, the real time tension monitoring system with wireless communication to a driver's smartphone device will eliminate the problems and disadvantages previously described.

One aspect of the exemplary embodiment is the real time tension measuring of a cargo strap. The tension is measured using a spring-loaded sensor, such as a magnet interacting with a hall effect sensor. When the device is installed on the strap, the strap is supported by two rigid supports and the spring-loaded sensor contacts the strap between the them. The strap in tension will apply a force to the spring-loaded sensor, causing it to deflect in the device. This deflection is measured using a proximity sensor, such as hall effect sensor. This deflection of the spring-loaded sensor can be translated into a compression force acting against the spring. Therefore, using the measured sensor deflection, the known spring constant, and the known geometric relationship between the rigid supports and the sensor, the strap tension can be calculated. A microprocessor is used to process the deflection signal from the spring-loaded sensor and calculate a strap tension.

Another aspect of the exemplary embodiment is the wireless communication of the real-time tension measurement of the cargo strap. The microprocessor will use the calculated tension and wirelessly transmit the value to the paired smartphone application through protocol such as, but not limited to, Bluetooth, Bluetooth Low Energy, or Wi-Fi.

Another aspect of the exemplary embodiment is the smartphone application which processes the tension signal from the device to a remote display and alert system. Said application includes a graphical user interface display scale or gauge to indicate the real-time level of tension. In addition, the user can set the initial pre-set tension indicator on the display for comparison to the real time tension measurement. This indicates to the driver that the tension has increased or decreased relative to the initially set tension. The application uses calibrated values to determine driver alerts of unsafe conditions, such as a percentage of tension decrease from the initially set tension or a tension close to the minimum or maximum tension value.

Another aspect of the exemplary embodiment is the applications ability to store and instantly pair with known devices. Said application can have programmed devices recognized and paired automatically upon start up, minimizing the time for the driver to initialize the device and begin monitoring.

Another aspect of exemplary embodiment is the quick clamping and latch installation design. This design allows it to be quickly installed, removed, or moved between straps on a trailer. In addition, the device can be installed onto a loose or already secured and tensioned strap, without the need to feed the strap through the device or attached to mating strap connections. This saves the driver extended installation and setup time of the device. This also allows the device to be used with several different strap types and sizes.

BRIEF DESCRIPTION OF THE SEVERAL VIEWS OF THE DRAWINGS

Aspects of the embodiments described above are better understood with reference to the accompanying drawings, in which:

FIG. 5A shows the internal electromechanical sensor mechanism and the device installed on the strap in the clamped state.

DETAILED DESCRIPTION OF THE INVENTION

Figure 1:
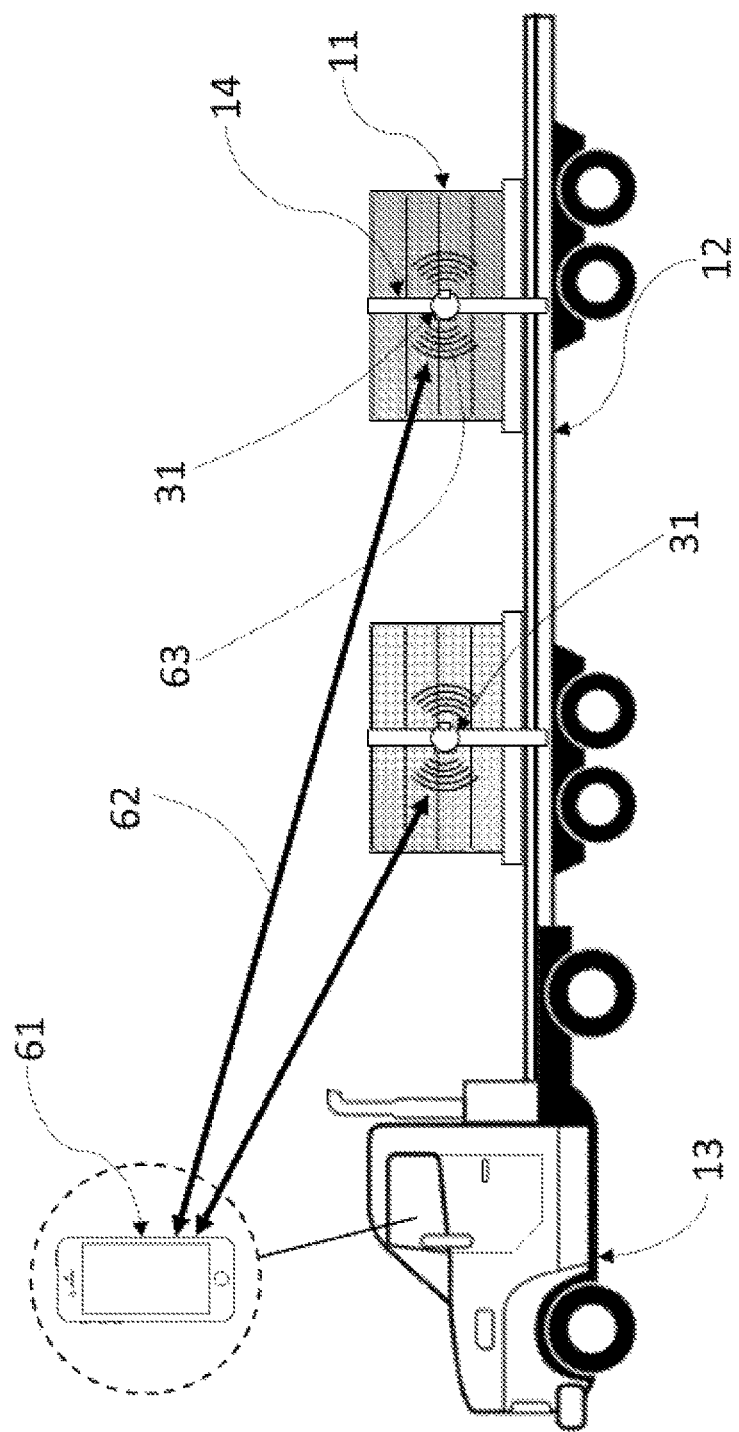
FIG. 1 is an illustration of a cargo load that is secured to a flatbed trailer with tensioned straps. The illustration also includes the tension monitoring system wirelessly communicating the tension signal to the mobile smartphone device located in the cab of the truck. There are two monitoring devices shown in this view, one on each strap.

FIG. 1 shows a concept of the exemplary embodiment tension monitoring device 31 in use on a truck 13 and flatbed trailer 12 transporting cargo 11. Multiple cargo loads 11 are secured to the trailer 12 using a tensioned strap 14, such as a ratchet strap. This concept illustrates the use of multiple monitoring devices 31 wirelessly communicating 63 the tension signals 62 to the mobile smartphone 61. While in use, the mobile smartphone 61 is in the cab of the truck 13 displaying all tension signals 62 and alerts for the driver through the smartphone application.

Figure 2:
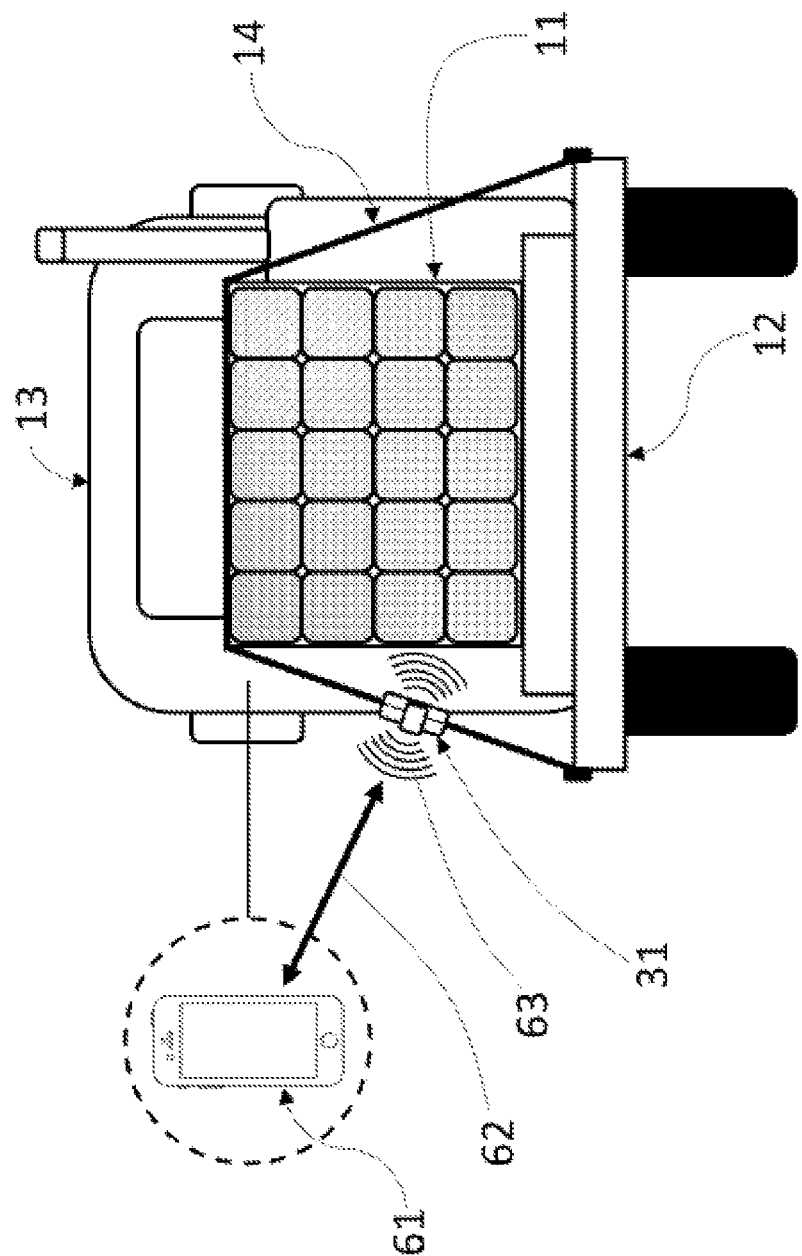
FIG. 2 is a rear view of the truck and trailer to further illustrate the tension monitoring device installation and wireless communication. There is one tension monitoring device shown in this view.

FIG. 2 is an additional view of the exemplary embodiment tension monitoring device 31, similar to FIG. 1, but from the rear of the truck 13 and trailer 12. This further illustrates the device 31 in use and wirelessly communicating 63 the tension signal 62 to the mobile smartphone 61.

Figure 3A:
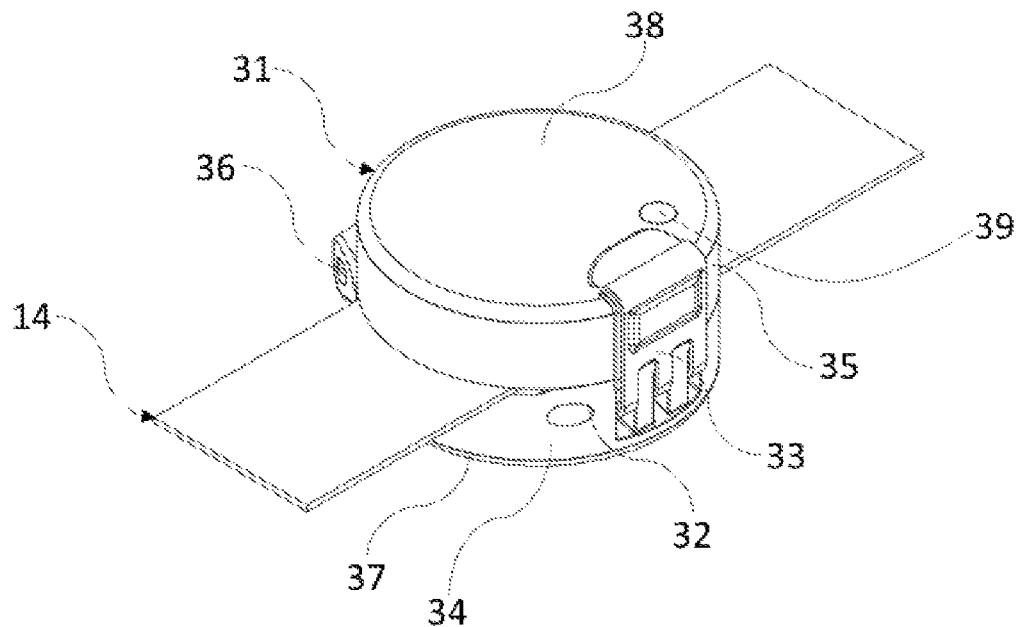
FIG. 3A shows an isometric view of the monitoring device installed on a strap.
Figure 3B:
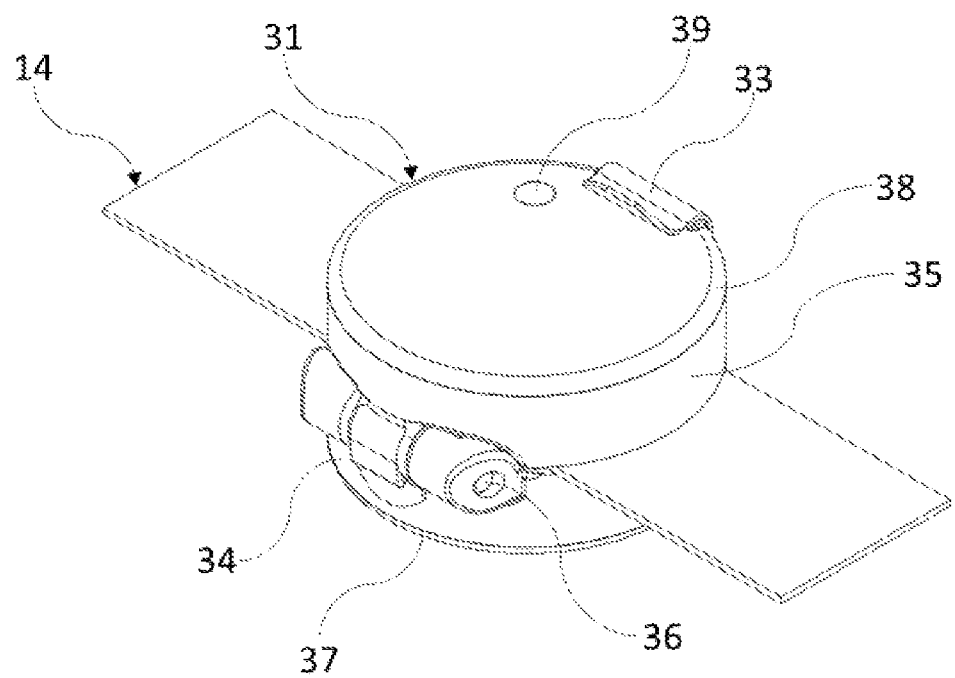
FIG. 3B shows an isometric view of the monitoring device installed on a strap, like FIG. 3A, but from the other side.

FIGS. 3A and 3B are isometric views of the tension monitoring device 31 installed on a strap 14. The device assembly 31 includes an upper housing 35 and upper housing cap 38 which are connected by a hinge 36 to a lower housing 34 and lower housing cap 37. The device 31 is clamped and secured to the strap 14 when the upper 35 and lower 34 housings pivot about the hinge 36 and close tightly around the strap 14. The housing 35 and 34 are then latched together using the latch 33 which has a hinge 32 that is integrated into the lower housing 34. The indicator window 39 is made of a transparent or translucent material to allow colored light indicators from the internal electronic circuitry to be seen by the user of the device 31. These are indicators such as, but not limited to, battery 49 charge status or wireless connection 63 status.

Figure 4A:
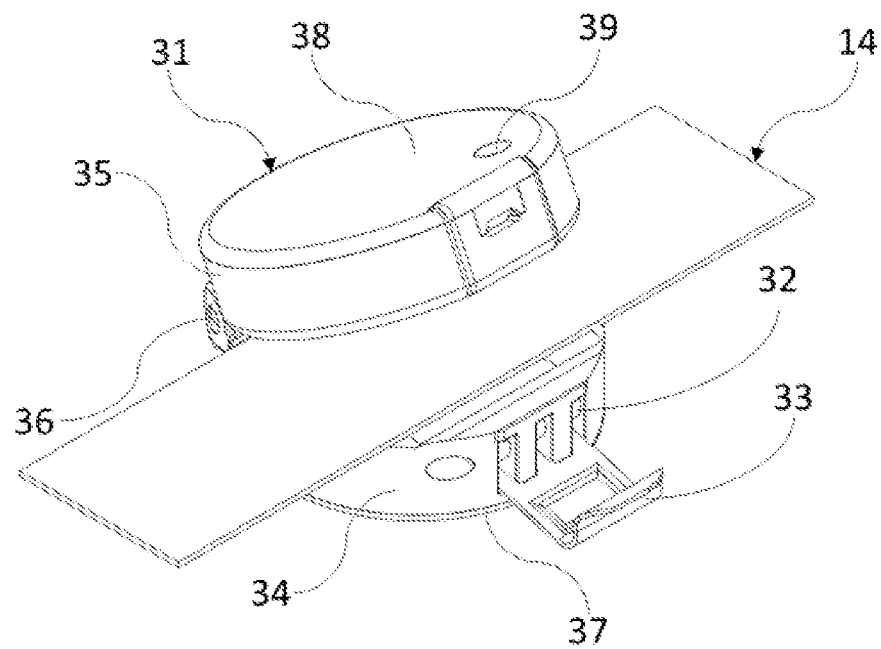
FIG. 4A is an isometric view of the monitoring device that is un-clamped on the tensioned strap to illustrate the clamping installation on the strap.

FIG. 4A is an isometric view and 4B is a side view of the tension monitoring device 31 while in the unclamped or unsecured state, prior to installation on the strap 14. From these views, it can be seen how the upper 35 and lower 34 housings pivot about hinge 36 as well as the latch 33 pivoting about the hinge 32.

Figure 4B:
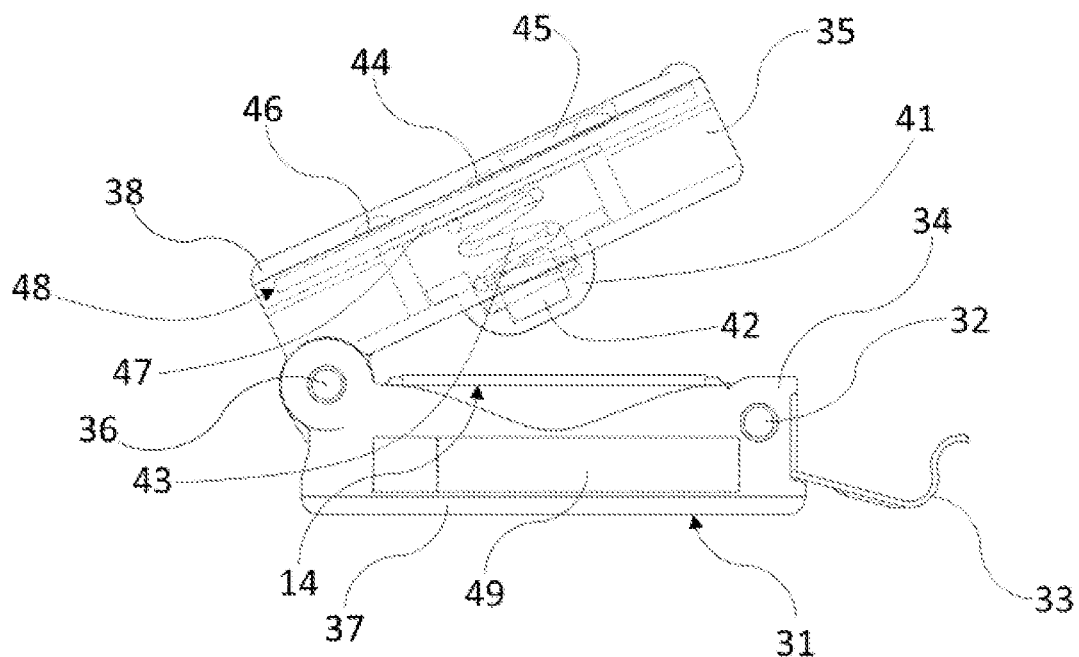
FIG. 4B is a side view, parallel to the strap, of the monitoring device that is un-clamped to illustrate the installation on the strap and include a view of the internal electromechanical sensor mechanism.

Further detail of the internal electromechanical sensor components can be seen in FIG. 4B. There is a printed circuit board assembly 48 which includes a sensor, such as a hall effect proximity sensor 44, as well as a microprocessor chip 45 that has wireless communication capabilities, such as Bluetooth or WiFi. The electronic components are powered by a battery 49. The circuit board assembly 48 is secured to the upper housing 35 using fasteners 46. The circuit board assembly 48 is protected from the spring forces by the spring pad 47 which contacts the spring 43. The spring 43 forces the magnet 42 and magnet holder 41 against the strap 14. The magnetic flux from the magnet 41 interacts with the proximity sensor 44 and is used to generate a tension value within the microprocessor 45 to be wirelessly transmitted. The holder 41 contacts the strap 14 when the device 31 is in the installed and clamped state. The spring-loaded magnet holder 41 and magnet 42 will deflect into the upper housing 34 from the contact force of strap 14 in tension.

Figure 5A:
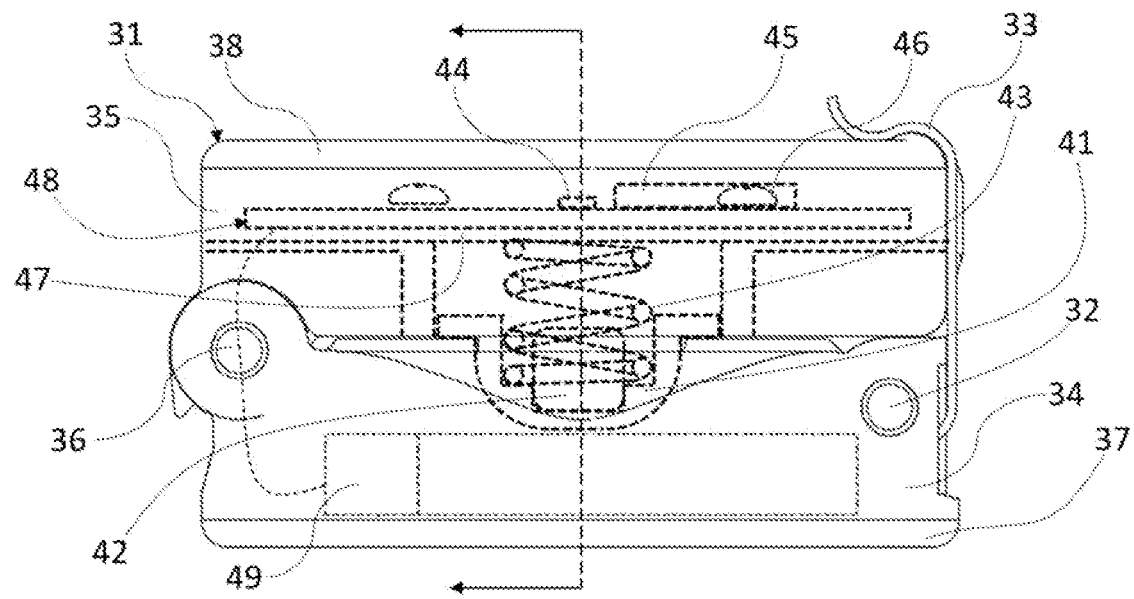
FIG. 5A is a side view of the monitoring device, parallel to the strap, to illustrate where the cross section in FIG. 5B is taken in perspective of. In addition.
Figure 5B:
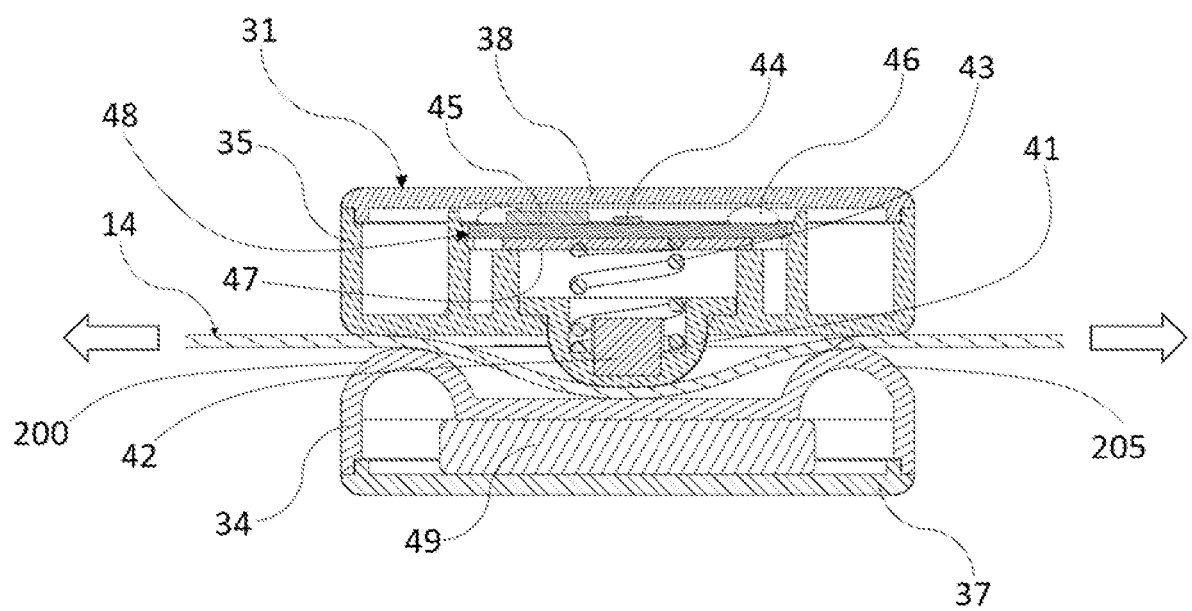
FIG. 5B is a cross section view of the device, sliced parallel to the strap according to FIG. 5A, to further illustrate internal electromechanical sensor mechanism.

Further detail of the internal components and mechanism can be seen in FIGS. 5A and 5B. FIG. 5A is a side view of the tension monitoring device 31, like FIG. 4B, but FIG. 5A is in the clamped state and installed on strap 14. The dotted line and arrows in FIG. 5A describe the cross-section view that is shown in FIG. 5B.

FIG. 5B shows the internal mechanism and how the strap 14 interacts with the spring-loaded magnet holder 41 and rigid supports 200 and 205 that are integrated into lower housing 34. Using a known height and spacing between the two supports and a known spring constant in spring 43 contacting the strap 14, the tension in the strap 14 can be calculated from the change in proximity of the magnet 42 to the sensor 44.

Figure 6:
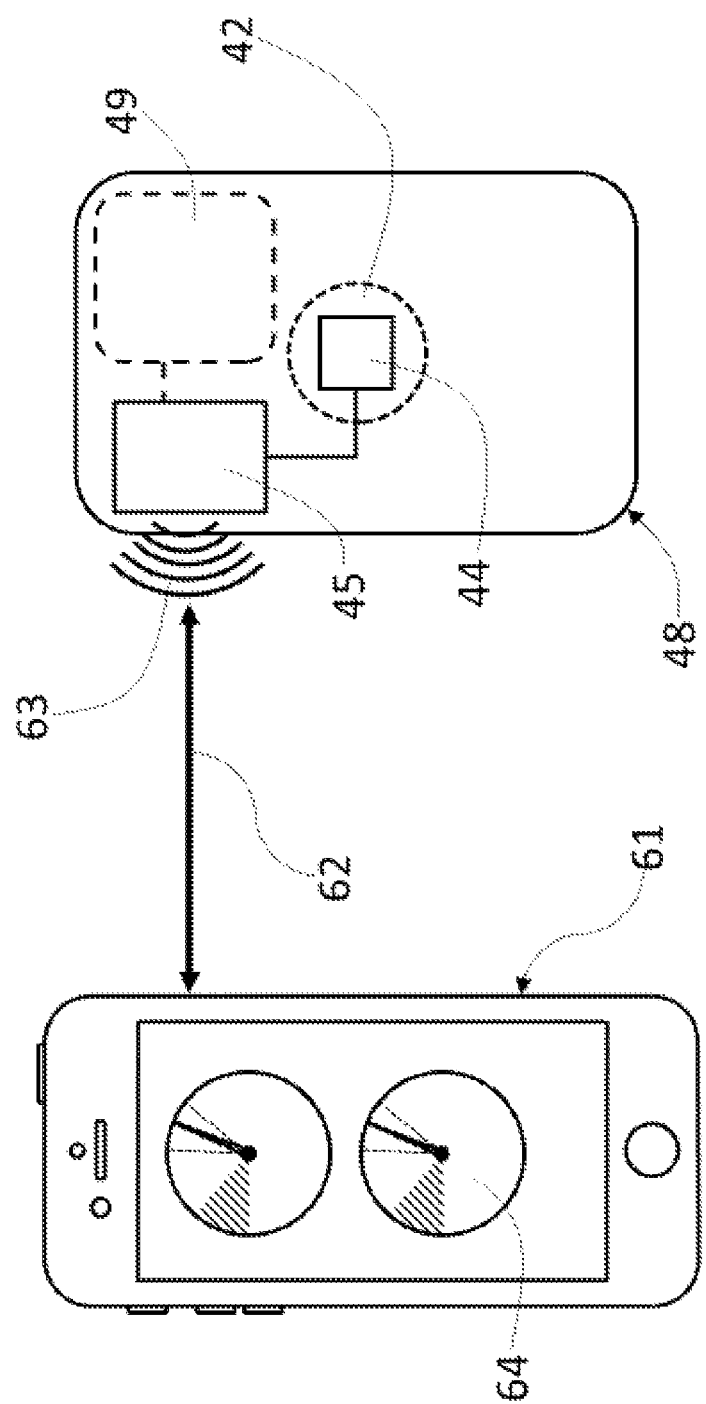
FIG. 6 illustrates the primary electrical circuitry of the device and the communication with the mobile smartphone application which displays tension levels.

FIG. 6 is a schematic of the primary components of the electrical circuit board assembly 48 and the interaction with the mobile smartphone 61 application. The primary components on the printed circuit board assembly 48 are the sensor 44 and microprocessor 45 with wireless capability 63. The assembly is powered by a battery 49. The general placement of the magnet 42 relative to the sensor 44 can also be seen. The magnet 42 and battery 49 are shown to be out of plane, compared to the circuit board assembly 48, as represented with the dotted lines. The microprocessor 45 wirelessly communicates 63 the tension information signal 62 to the mobile smartphone 61 application. The application contains monitoring software to process the signal 62 to display for the driver, such as, but not limited to, digital tension gauges 64 that indicate tension at the start of trip, acceptable variation in the pre-set tension, and a warning or alert feature indicating an unsafe or loss of tension condition.

What is claimed is:

1. A cargo strap tension monitoring device comprising:
an upper housing and a lower housing connected by a hinge and said cargo strap tension monitoring device, the upper housing having an upper housing hinge side and an upper housing latch side, the lower housing having a lower housing hinge side and a lower housing latch side, and said cargo strap tension monitoring device having a sensor and said cargo strap tension monitoring device is clamped onto a cargo strap used with a vehicle;
a circuit board assembly having at least one status indicator, the circuit board assembly secured in the upper housing;
an indicator window disposed on the upper housing for allowing light from the at least one status indicator to be seen by a user of the device;
wherein the upper and lower housings are latched together on the latch side of the upper housing and lower housing by a latch;
wherein the cargo strap rests on a first rigid support and a second rigid support and is in contact with a spring-loaded magnet holder and said spring-loaded magnet holder is a spring-loaded mechanism located between said first support and said second support such that the strap forces deflect the spring-loaded magnet holder as a function of strap tension; and wherein the spring-loaded magnet-holder includes a magnet interacting with said sensor to monitor tension in said cargo strap and said cargo strap tension monitoring device further comprising a battery positioned in the lower housing and a microprocessor disposed on the circuit board assembly.

2. The cargo strap tension monitoring device of claim 1, wherein the cargo strap tension monitoring device is installed by clamping the cargo strap tension monitoring device onto said cargo strap.

3. The cargo strap tension monitoring device of claim 1 wherein the cargo strap tension monitoring device is a combination smartphone and cargo strap tension monitoring device wherein the cargo strap tension monitoring device wirelessly communicates the tension in said cargo strap to said smartphone and said smartphone having a remote smartphone application that compares a preset minimum tension value and a preset maximum tension value to said cargo strap tension.

4. The combination smartphone and cargo strap tension monitoring device of claim 3, wherein the remote smartphone application includes the preset minimum tension value and the preset maximum tension value and said remote smartphone application monitors for changes in said cargo strap tension comparing said cargo strap tension to said preset minimum tension value and said preset maximum tension value and when said cargo strap tension is near or below said preset minimum tension value or said preset maximum tension value on said remote smartphone application then said smartphone alerts a driver.

5. The combination smartphone and cargo strap tension monitoring device of claim 3, wherein the remote smartphone application alerts a driver to changes of tension and sends an alert to said driver if said tension is below said preset minimum tension value or above said preset maximum tension value and said alerts selected from the group consisting of visual, audible, and physical alerts.

6. The combination smartphone and cargo strap tension monitoring device of claim 3, wherein the mobile smartphone application records a global positioning system location at the time of said alert.

7. The cargo strap tension monitoring device of claim 1, wherein the cargo strap tension monitoring device is a combination smartphone and cargo strap tension monitoring device wherein the device wirelessly communicates cargo strap tension-monitoring device health information to said smartphone having the remote smartphone application and said cargo strap tension monitoring device health information comprising remaining battery charge life.

8. The cargo strap tension monitoring device of claim 1, wherein said sensor is a hall effect proximity sensor.

\* \* \* \* \*